United States Patent
Wu et al.

(10) Patent No.: US 9,507,103 B2
(45) Date of Patent: Nov. 29, 2016

(54) QUICK UNLOCKING OPTICAL FIBER PLUG CONNECTOR

(71) Applicant: Advanced-Connectek Inc., New Taipei (TW)

(72) Inventors: Jun Wu, New Taipei (TW); Yangyang Cui, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 0 days.

(21) Appl. No.: 15/098,708

(22) Filed: Apr. 14, 2016

(65) Prior Publication Data

US 2016/0306125 A1    Oct. 20, 2016

(30) Foreign Application Priority Data

Apr. 20, 2015   (CN) .................... 2015 2 0237676 U

(51) Int. Cl.
  *G02B 6/36*   (2006.01)
  *G02B 6/38*   (2006.01)

(52) U.S. Cl.
  CPC ............. *G02B 6/3893* (2013.01); *G02B 6/387* (2013.01); *G02B 6/3821* (2013.01); *G02B 6/3885* (2013.01); *G02B 6/3887* (2013.01)

(58) Field of Classification Search
  CPC .. G02B 6/3893; G02B 6/3821; G02B 6/387; G02B 6/3885; G02B 6/3887

USPC .......................................................... 385/86
See application file for complete search history.

(56) References Cited

U.S. PATENT DOCUMENTS

| | | | |
|---|---|---|---|
| 8,221,007 B2 | 7/2012 | Peterhans et al. | |
| 8,465,317 B2 | 6/2013 | Gniadek et al. | |
| 2011/0058773 A1* | 3/2011 | Peterhans ............ | G02B 6/3893 385/76 |
| 2011/0317976 A1* | 12/2011 | Eckstein .............. | G02B 6/3825 385/139 |
| 2015/0212282 A1* | 7/2015 | Lin ...................... | G02B 6/3893 385/76 |

* cited by examiner

*Primary Examiner* — Jerry Blevins
(74) *Attorney, Agent, or Firm* — patenttm.us

(57) ABSTRACT

A quick unlocking optical fiber plug connector has a casing, an optical fiber plug module, a pull lever and a cable assembly. The optical fiber plug module is mounted on a front end of the casing and has a module case and an optical fiber shaft assembly. The module case has a locking arm, a resilient linking tab and a connecting member formed on the module case and connected to one another. The pull lever has a drive member formed on a front end of a lever body. The drive member has a connecting slot and a through slot to accommodate the connecting member and part of the resilient linking tab. The drive member and the connecting member are securely connected to prevent the pull lever from being inadvertently disengaged from the resilient linking tab. The pull lever is straight and strap-like to facilitate pulling action for unlocking.

11 Claims, 7 Drawing Sheets

QUICK UNLOCKING OPTICAL FIBER PLUG CONNECTOR

BACKGROUND OF THE INVENTION

1. Field of the Invention

The present invention relates to an optical fiber connector, and more particularly to a quick unlocking optical fiber plug connector that is engaged stably with a corresponding receptacle connector through a lock. Pulling a pull lever on the quick unlocking optical fiber plug connector quickly disengages the quick unlocking optical fiber plug connector from the corresponding receptacle connector. Furthermore, the pull lever is connected firmly to the lock and is not separated there-from inadvertently.

2. Description of Related Art

Compared to conventional electrical connectors, optical fiber connectors transmit signals by optical fibers and have comparatively high signal transmission rates. Thus, the optical fiber connectors may be adapted for high end computer servers designed to provide large dataflow processing service.

U.S. Pat. No. 8,221,007 discloses an optical fiber plug connector with a lock. A first embodiment of the optical fiber plug connector has a casing, a locking arm, a connecting tab, a movable collar and a clamp. The locking arm is formed on the casing and has two opposite locking shoulders formed on the locking arms. The connecting tab is formed on and protrudes rearward from the locking arm. The movable collar is mounted slidably around the casing and is connected to the connecting tab. The clamp is mounted around the movable collar. Moving the movable collar backward pulls and pivots down the locking arm such that the optical fiber plug connector may be unlocked and detached from a corresponding receptacle connector. A second embodiment disclosed in the aforementioned patent is implemented without the connecting tab and instead has a clip formed on the movable collar and having a clipping hole defined through the clip and receiving the locking arm. Moving the movable collar backward pulls and pivots down the locking arm to unlock the optical fiber plug connector. A third embodiment of the optical fiber plug connector is similar to the second embodiment. However, the movable collar and the clamp are too short to be held and manipulated. Furthermore, the locking arm and the clip are loosely hooked together and are easily inadvertently disengaged.

U.S. Pat. No. 8,465,317 discloses another optical fiber plug connector having several embodiments. One of the embodiments has a casing, a locking arm, a release member and an extender. The locking arm protrudes upward from and is pivotable relative to the casing. The release member is mounted slidably around the casing and hooks on two opposite sides of the locking arm. The extender is connected to a rear end of the release member. Pulling the extender backward pivots down the locking arm and unlocks the optical fiber plug connector. However, the release member merely hooks on the opposite sides of the locking arm without a stable and secure connecting mechanism. Therefore, inadvertent disengagement is easily incurred between the release arm and the locking arm. The rest of the embodiments omit the release member and directly attach a front end of the extender to the locking arm. However, none of those embodiments has a stable and secure connecting mechanism between the extender and the locking arm.

To overcome the shortcomings, the present invention provides a quick unlocking optical fiber plug connector to mitigate or obviate the aforementioned problems.

SUMMARY OF THE INVENTION

The main objective of the invention is to provide a quick unlocking optical fiber plug connector that is engaged stably with a corresponding receptacle connector through a lock. Pulling a pull lever on the quick unlocking optical fiber plug connector quickly disengages the quick unlocking optical fiber plug connector from the corresponding receptacle connector. Furthermore, the pull lever is connected firmly to the lock and is not separated there-from inadvertently.

A quick unlocking optical fiber plug connector in accordance with the present invention has a casing, an optical fiber plug module, a pull lever and a cable assembly. The optical fiber plug module is mounted on a front end of the casing and has a module case and an optical fiber shaft assembly. The module case has a locking arm, a resilient linking tab and a connecting member formed on the module case and connected to one another. The pull lever has a drive member formed on a front end of a lever body. The drive member has a connecting slot and a through slot to accommodate the connecting member and part of the resilient linking tab. The drive member and the connecting member are securely connected to prevent the pull lever from being inadvertently disengaged from the resilient linking tab. The pull lever is straight and strap-like to facilitate pulling action for unlocking.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
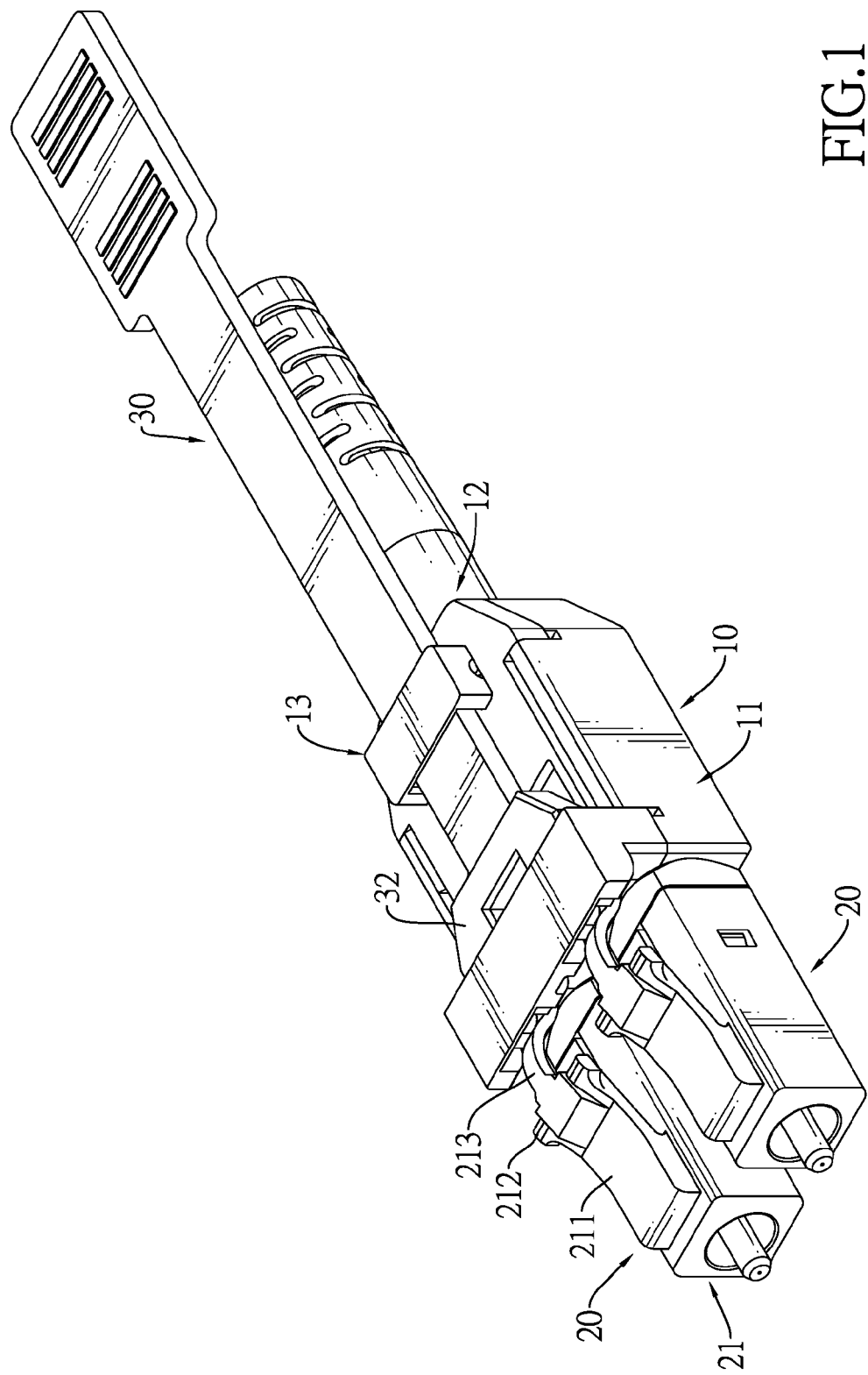
FIG. 1 is a perspective view of a quick unlocking optical fiber plug connector in accordance with the present invention.

With reference to FIG. 1, a quick unlocking optical fiber plug connector in accordance with the present invention comprises a casing 10, two optical fiber plug modules 20, a pull lever 30 and a cable assembly 40.

The casing 10 has a body 11 and an outer cover 12.

Figure 2:
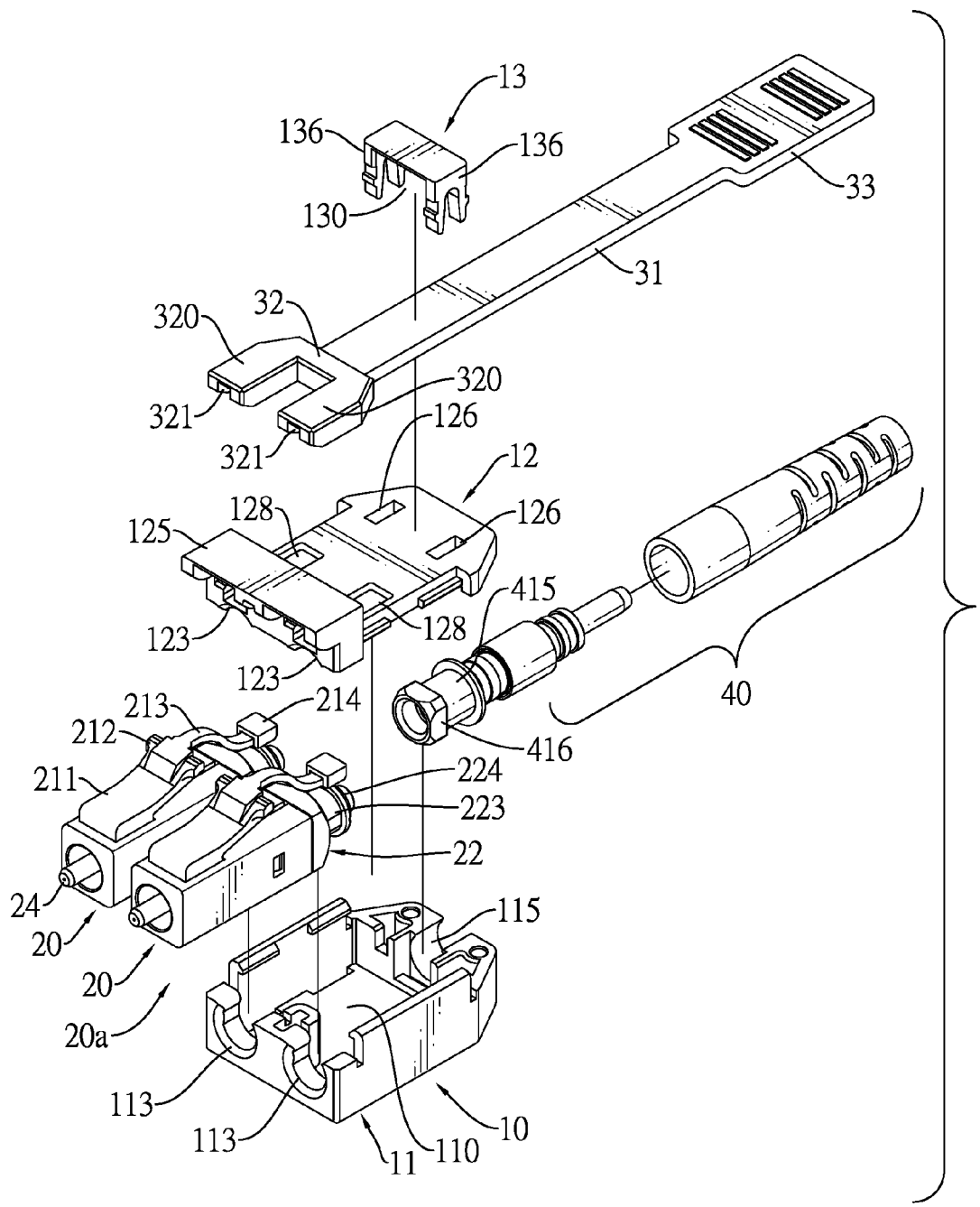
FIG. 2 is a partially exploded perspective view of the quick unlocking optical fiber plug connector in FIG. 1.
Figure 3:
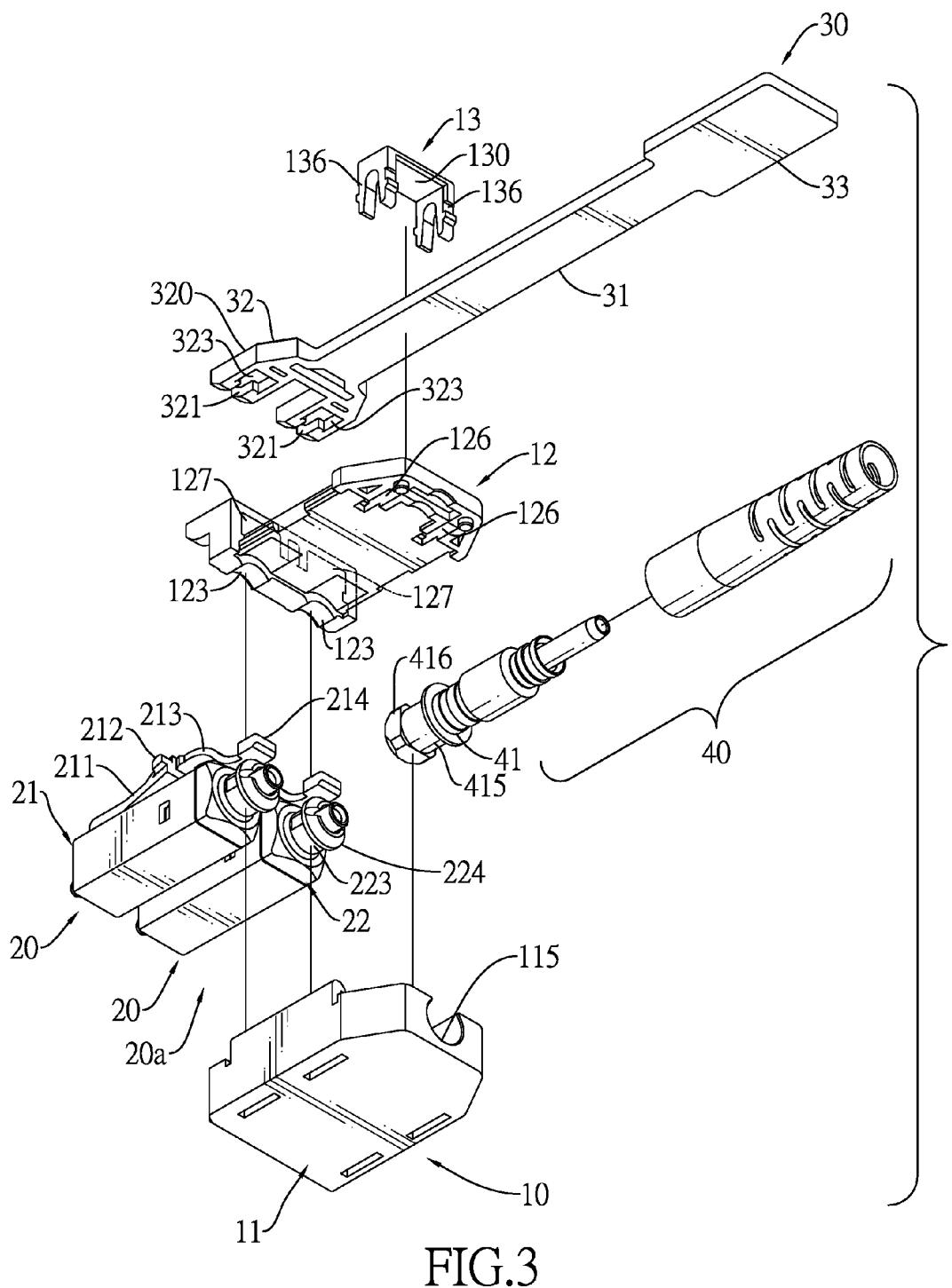
FIG. 3 is another partially exploded perspective view of the quick unlocking optical fiber plug connector in FIG. 1.

With reference to FIGS. 2 and 3, the body 11 has a cavity 110, two casing assembling slots 113 and a mounting slot 115. The cavity 110 is defined in the body 11. The casing assembling slots 113 are defined in a front end of the body 11 and communicate with the cavity 110. The mounting slot 115 is defined in a rear end of the body 11.

The outer cover 12 is mounted on the body 11, covers the cavity 110 and has a positioning block 125, two cover assembling slots 123, a limiting member 13, two hooking holes 126 and two linear sliding slots 128. The positioning block 125 is formed on the outer cover 12 and has two positioning through holes 127 defined through the positioning block 125. The cover assembling slots 123 are defined in the outer cover 12 and are respectively combined with the casing assembling slots 113 to form two assembling apertures. The hooking holes 126 are defined through the outer cover 12. The linear sliding slots 128 are defined on an outer surface of the outer cover 12. The limiting member 13 is U-shaped, is mounted on the outer cover 12 and has a limiting through hole 130 and two fork hooks 136. The limiting through hole 130 is defined through the limiting member 13. The fork hooks 136 are formed on and protrude from the limiting member 13 and respectively hook in the hooking holes 126.

Figure 4:
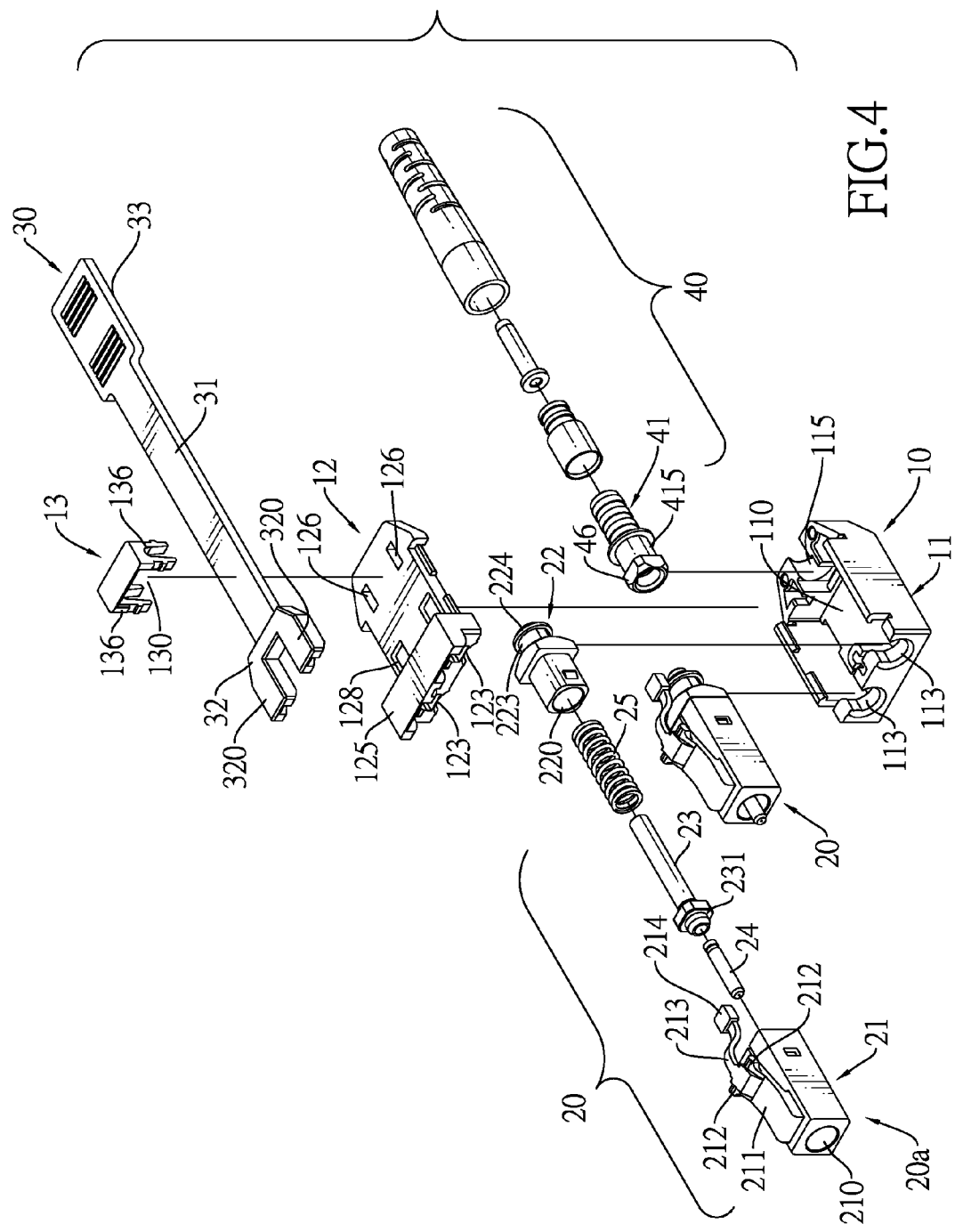
FIG. 4 is a fully exploded perspective view of the quick unlocking optical fiber plug connector in FIG. 1.
Figure 5:
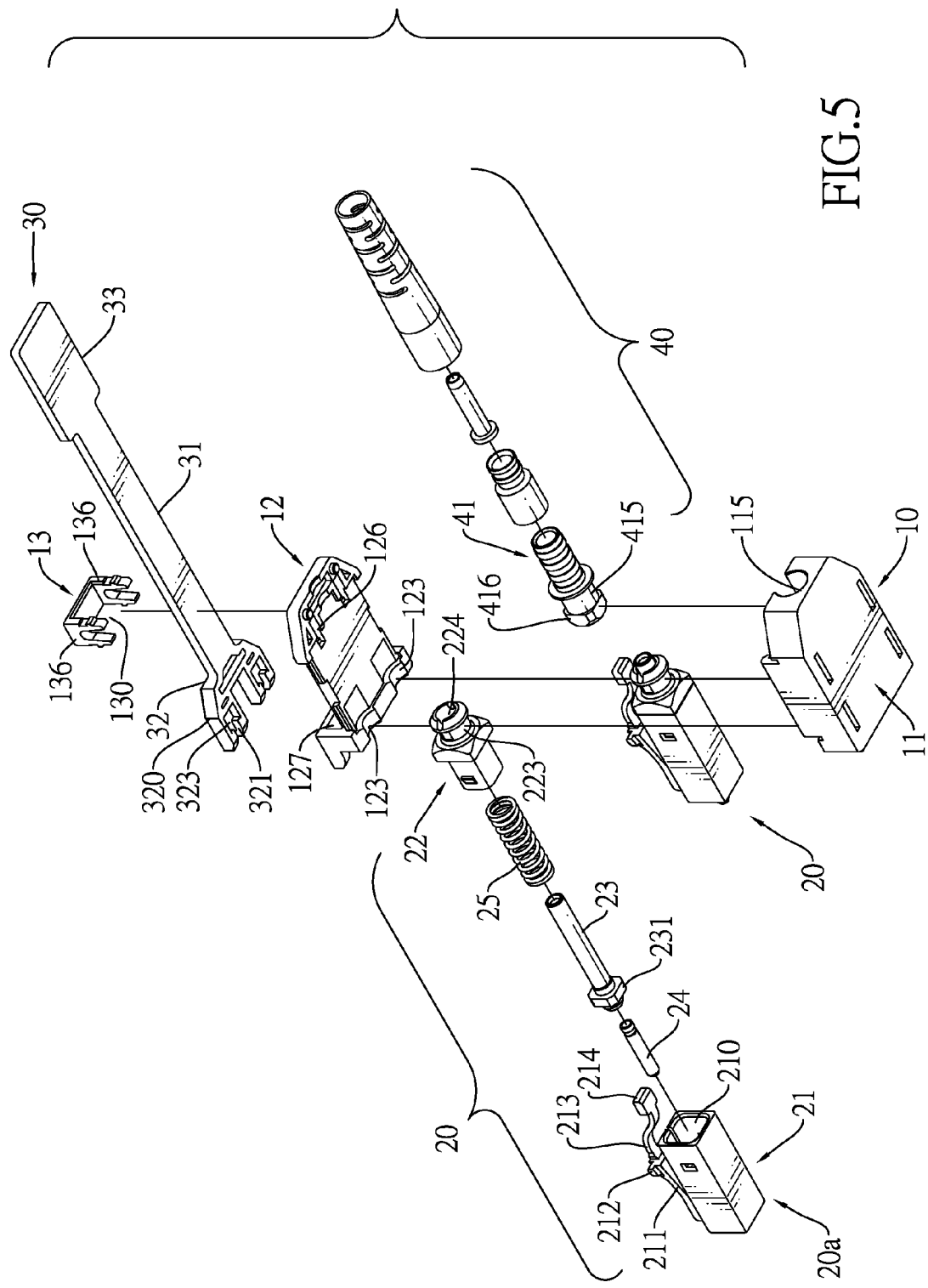
FIG. 5 is another fully exploded perspective view of the quick unlocking optical fiber plug connector in FIG. 1.

With further reference to FIGS. 4 and 5, the optical fiber plug modules 20 are mounted on a front end of the casing 10, correspond to the positioning through holes 127, correspond to the linear sliding slots 128, correspond to the assembling apertures, and each optical fiber plug module 20 has a module case 20a and an optical fiber shaft assembly.

The module case 20a is mounted on the front end of the casing 10 and has a locking arm 211, a resilient linking tab 213, a connecting member 214 and an assembling protrusion 223. The locking arm 211 is flexible and deformable, is formed on and protrudes obliquely outward from the module case 20a and has at least one locking element 212. The at least one locking element 212 is formed on and protrudes laterally outward from the locking arm 211. The resilient linking tab 213 is formed on and protrudes from a rear end of the locking arm 211 and slidably extends through a corresponding positioning through hole 127. The connecting member 214 is formed on a rear end of the resilient linking tab 213 and is mounted slidably in a corresponding linear sliding slot 128. Furthermore, a width of the connecting member 214 is larger than a width of the resilient linking tab 213. The assembling protrusion 223 is formed on and protrudes rearward from a rear end of the module case 20a, is mounted detachably in a corresponding assembling aperture and has a stopper ring 224 formed on and protruding radially from the assembling protrusion 223 and hooking in an inner surface of the cavity 110.

Moreover, the module case 20a may be assembled from a cylinder 21 and a rear plug 22. The cylinder 21 has a chamber 210 defined through the cylinder 21. The locking arm 211 of the module case 20a is formed on the cylinder 21. The rear plug 22 is mounted in the chamber 210 through a rear end of the cylinder 21 and has an internal space 220 defined in the rear plug 22. The assembling protrusion 223 of the module case 20a is formed on the rear plug 22.

The optical fiber shaft assembly is mounted in the module case 20a and has a movable shaft 23, an optical fiber head pin 24 and a spring 25. The movable shaft 23 is hollow and has a stopper flange 231 formed on and protruding radially from the movable shaft 23. The optical fiber head pin 24 is hollow and is mounted in a front end of the movable shaft 23. The spring 25 is mounted around the movable shaft 23 and has two ends respectively pressing against the stopper flange 231 and an inner surface of the internal space 220 of the rear plug 22.

The pull lever 30 is strap-like, is mounted slidably on the outer cover 12, extends through the limiting through hole 130 of the limiting member 13, and has a lever body 31, a drive member 32 and a pull tab 33.

The lever body 31 extends through the limiting through hole 130 of the limiting member 13.

The drive member 32 is formed on a front end of the lever body 31. A width of the drive member 32 is larger than a width of the limiting through hole 130. The drive member 32 has two drive tabs 320. Each drive tab 320 extends through one of the positioning through holes 127 of the positioning block 125 and has a connecting slot 323 and a through slot 321. The connecting slot 323 is formed on a bottom surface of the drive member 32, faces the outer cover 12 and accommodates one of the connecting members 214 such that the connecting member 214 is covered between the outer cover 12 and the drive tab 320. The through slot 321 is defined through a front end of the drive tab 320, communicates with the connecting slot 323 and partially receives one of the resilient linking tabs 213.

The pull tab 33 is formed on a rear end of the lever body 31 and allows a user to grab and pull the pull tab 33.

Figure 6:
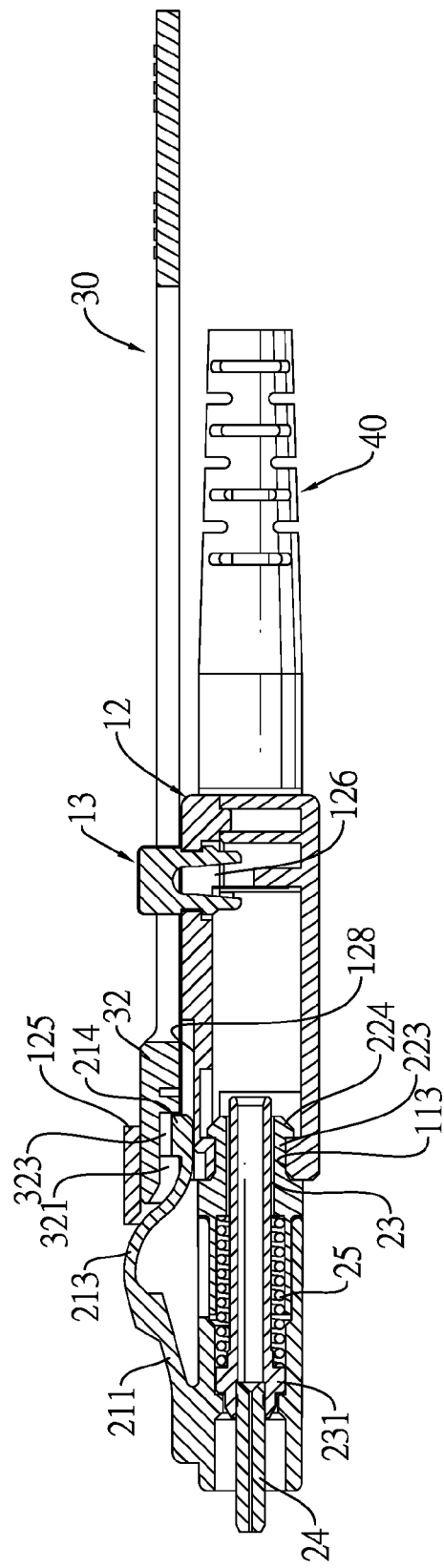
FIG. 6 is a cross sectional side view of the quick unlocking optical fiber plug connector in FIG. 1.

With reference to FIG. 6, when the quick unlocking optical fiber plug connector is idle or engaged with a corresponding receptacle connector, the locking arm 211 is oblique relative to the module case 20a, and the resilient linking tab 213 is curved and arched.

Figure 7:
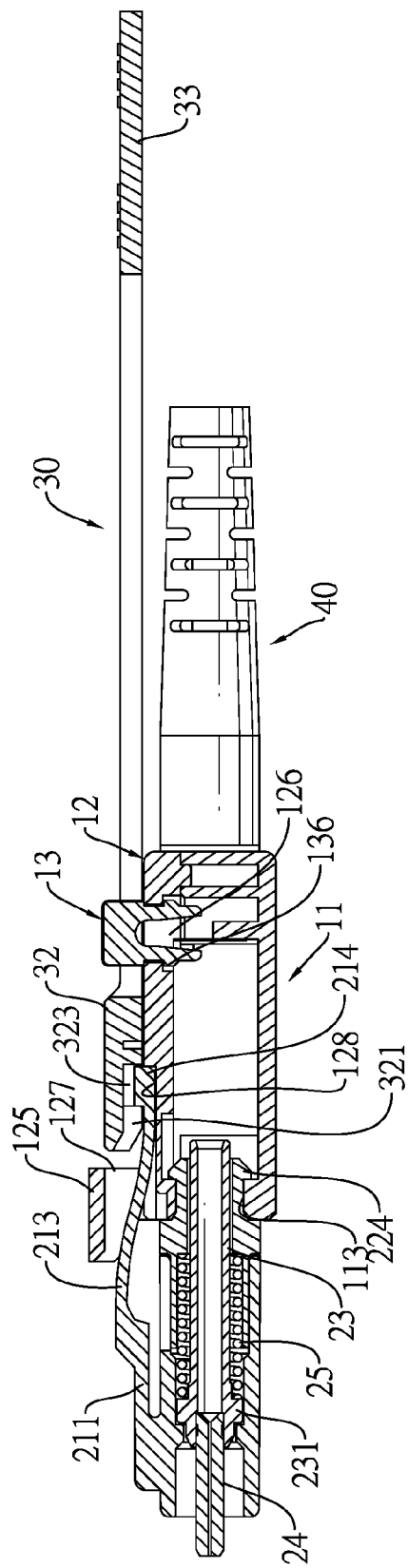
FIG. 7 is an operational sectional side view of the quick unlocking optical fiber plug connector in FIG. 6 showing that a locking arm is driven to pivot down to unlock the quick unlocking optical fiber plug connector.

With reference to FIG. 7, pulling the pull lever 30 backward drives the drive member 32 and the connecting member 214 to move rearward and stretches the resilient linking tab 213 to be straight. At the meantime, the locking arm 211 pivots toward the module case 20a and drives the at least one locking element 212 to be disengaged from a locking slot on the corresponding receptacle connector.

The cable assembly 40 is mounted on a rear end of the casing 10 and has a bushing 41. The bushing 41 is mounted on the rear end of the casing 10 and has a mounting protrusion 415 and a limiting flange 416. The mounting protrusion 415 is formed on a front end of the bushing 41 and is mounted in the mounting slot 115 of the body 11. The limiting flange 416 is formed on and protrudes radially from the mounting protrusion 415 and hooks on the inner surface of the cavity 110.

The quick unlocking optical fiber plug connector has the following advantages.

1. The connecting member 214 of each optical fiber plug module 20 connected to the locking arm 211 is secured in the connecting slot 323 of the drive member 32 and is covered between the outer cover 12 and the drive tab 320 such that inadvertent detachment of the connecting member 214 is avoided. Furthermore, the positioning through holes 127 of the positioning block 125 ensure that the drive member 32 of the pull lever 30 is moved linearly without being inadvertently lifted and detached. Therefore, the pull lever 30 is able to stably and repeatedly drive the connecting member 214 to pivot the locking arms 211.

2. The assembling protrusion 223 of each optical fiber plug module 20 is detachably mounted on the front end of the casing 10. When the two optical fiber plug modules 20 are required to be exchanged due to adjustment of signal transmission or required to be replaced due to maintenance, detaching the outer over 12 from the body 11 quickly and conveniently replaces or exchanges the optical fiber plug modules 20 without substituting the whole quick unlocking optical fiber plug connector.

3. The cable assembly 40 is also detachably mounted on the rear end of the casing 10 through the mounting protrusion, which facilitates replacement of the quick unlocking optical fiber plug connector or the cable assembly 40.

4. The strap-like pull lever 30 allows a user to conveniently pull the pull tab 33 on the pull lever 30 to unlock the quick unlocking optical fiber plug connector.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An optical fiber plug connector comprising:
a casing having
a body having a cavity defined in the body; and
an outer cover mounted on the body, covering the cavity and having a positioning block formed on the outer cover and having a positioning through hole defined through the positioning block;
an optical fiber plug module mounted on a front end of the casing and having
a module case mounted on the front end of the casing and having
a locking arm being flexible and deformable, formed on and protruding obliquely outward from the module case, and having at least one locking element formed on and protruding laterally outward from the locking arm;
a resilient linking tab formed on and protruding from a rear end of the locking arm and slidably extending through the positioning through hole; and
a connecting member formed on a rear end of the resilient linking tab; and
an optical fiber shaft assembly mounted in the module case;
a pull lever being strap-like, mounted slidably on the outer cover and having
a lever body; and
a drive member formed on a front end of the lever body and having a drive tab extending through the positioning through hole of the positioning block and having
a connecting slot formed on a bottom surface of the drive member, facing the outer cover, and accommodating the connecting member such that the connecting member is covered between the outer cover and the drive tab; and
a through slot defined through a front end of the drive tab, communicating with the connecting slot, and partially receiving the resilient linking tab, wherein pulling the pull lever backward drives the drive member and the connecting member to move rearward and stretches the resilient linking tab to be straight; and
a cable assembly mounted on a rear end of the casing.

2. The optical fiber plug connector as claimed in claim 1, wherein
the outer cover has a limiting member being U-shaped, mounted on the outer cover and having a limiting through hole defined through the limiting member and through which the lever body extends; and
a width of the drive member is larger than a width of the limiting through hole.

3. The optical fiber plug connector as claimed in claim 2, wherein
the outer cover has a linear sliding slot defined on an outer surface of the outer cover; and
the connecting member is mounted slidably in the linear sliding slot.

4. The optical fiber plug connector as claimed in claim 3, wherein a width of the connecting member is larger than a width of the resilient linking tab.

5. The optical fiber plug connector as claimed in claim 4, wherein
the outer cover has two hooking holes defined through the outer cover; and
the limiting member has two fork hooks formed on and protruding from the limiting member and respectively hooking in the two hooking holes.

6. The optical fiber plug connector as claimed in claim 5, wherein
the body has a casing assembling slot defined in a front end of the body and communicating with the cavity;
the outer cover has a cover assembling slot defined in the outer cover and combined with the casing assembling slot to form an assembling aperture;
the module case has an assembling protrusion formed on and protruding rearward from a rear end of the module case, mounted detachably in the assembling aperture, and having a stopper ring formed on and protruding radially from the assembling protrusion and hooking in an inner surface of the cavity.

7. The optical fiber plug connector as claimed in claim 6, wherein
the module case is assembled from a cylinder and a rear plug;
the cylinder has a chamber defined through the cylinder;
the locking arm of the module case is formed on the cylinder;
the rear plug is mounted in the chamber through a rear end of the cylinder and has an internal space defined in the rear plug; and
the assembling protrusion of the module case is formed on the rear plug.

8. The optical fiber plug connector as claimed in claim 7, wherein the optical fiber shaft assembly has
a movable shaft being hollow and having a stopper flange formed on and protruding radially from the movable shaft;
an optical fiber head pin being hollow and mounted in a front end of the movable shaft; and
a spring mounted around the movable shaft and having two ends respectively pressing against the stopper flange and an inner surface of the internal space of the rear plug.

9. The optical fiber plug connector as claimed in claim 8, wherein
the body has a mounting slot defined in a rear end of the body;
the cable assembly has a bushing mounted on the rear end of the casing and having
a mounting protrusion formed on a front end of the bushing and mounted in the mounting slot of the body; and
a limiting flange formed on and protruding radially from the mounting protrusion and hooking on the inner surface of the cavity.

10. The optical fiber plug connector as claimed in claim 9, wherein the pull lever has a pull tab formed on a rear end of the lever body.

11. An optical fiber plug connector comprising:
a casing having
a body having a cavity defined in the body; and
an outer cover mounted on the body, covering the cavity, and having a positioning block formed on the outer cover and having two positioning through holes defined through the positioning block;

two optical fiber plug modules corresponding to the positioning through holes, mounted on a front end of the casing and each optical fiber plug module having
- a module case mounted on the front end of the casing and having
  - a locking arm being flexible and deformable, formed on and protruding obliquely outward from the module case and having at least one locking element formed on and protruding laterally outward from the locking arm;
  - a resilient linking tab formed on and protruding from a rear end of the locking arm and slidably extending through a corresponding positioning through hole; and
  - a connecting member formed on a rear end of the resilient linking tab; and
- an optical fiber shaft assembly mounted in the module case;

a pull lever being strap-like, mounted slidably on the outer cover and having
- a lever body; and
- a drive member formed on a front end of the lever body and having two drive tabs extending respectively through the two positioning through holes of the positioning block and each drive tab having
  - a connecting slot formed on a bottom surface of the drive member, facing the outer cover, and accommodating one of the connecting members such that the connecting member is covered between the outer cover and the drive tab; and
  - a through slot defined through a front end of the drive tab, communicating with the connecting slot, and partially receiving one of the resilient linking tabs, wherein pulling the pull lever backward drives the drive member and the connecting member to move rearward and stretches the resilient linking tab to be straight; and a cable assembly mounted on a rear end of the casing.

* * * * *